(12) United States Patent
Belik

(10) Patent No.: US 7,963,371 B2
(45) Date of Patent: Jun. 21, 2011

(54) CENTRIFUGAL APPLICATOR SYSTEM

(75) Inventor: Jaroslav Belik, Pearland, TX (US)

(73) Assignee: National Oilwell Varco, L.P., Houston, TX (US)

( * ) Notice: Subject to any disclaimer, the term of this patent is extended or adjusted under 35 U.S.C. 154(b) by 125 days.

(21) Appl. No.: 12/112,531

(22) Filed: Apr. 30, 2008

(65) Prior Publication Data

US 2009/0272603 A1  Nov. 5, 2009

(51) Int. Cl.
*F16F 1/24* (2006.01)

(52) U.S. Cl. ......... 184/6; 184/6.11; 184/6.21; 184/6.24; 184/6.18; 184/14; 427/236; 427/446; 427/447; 118/105; 118/317; 118/323; 118/668; 118/712

(58) Field of Classification Search .................. 184/6.11, 184/18, 7.4, 14, 15.2, 15.3; 427/236, 430, 427/240; 118/317, 699, 55, 323, 708; 239/79, 239/81
See application file for complete search history.

(56) References Cited

U.S. PATENT DOCUMENTS

| | | | |
|---|---|---|---|
| 1,988,329 A | 5/1933 | Perkins | |
| 2,760,585 A | 8/1952 | Bergeron | |
| 2,810,145 A | 4/1953 | Forrow | |
| 2,642,034 A * | 6/1953 | Griffin et al. | 118/317 |
| 3,252,442 A * | 5/1966 | Hazlett | 118/685 |
| 4,268,544 A | 5/1981 | Wallace | |
| 4,372,245 A * | 2/1983 | Watson et al. | 118/56 |
| 4,891,244 A | 1/1990 | Wallace | |
| 5,141,774 A | 8/1992 | Prittinen et al. | |
| 5,259,880 A | 11/1993 | Fujita et al. | |
| 5,341,887 A | 8/1994 | Deken et al. | |
| 5,534,060 A * | 7/1996 | Johnson | 118/55 |
| 5,985,357 A * | 11/1999 | Sanada | 427/8 |
| 6,001,425 A | 12/1999 | Stash et al. | |
| 6,117,242 A * | 9/2000 | Kreiselmaier | 118/712 |
| 6,228,169 B1 | 5/2001 | Wallace | |
| 6,309,693 B1 | 10/2001 | Wallace et al. | |
| 6,405,810 B1 * | 6/2002 | Grach et al. | 175/52 |
| 6,638,366 B2 | 10/2003 | Lammert et al. | |
| 7,132,127 B2 | 11/2006 | Belik | |
| 2002/0125074 A1 * | 9/2002 | Roehrborn | 184/58 |
| 2004/0140159 A1 * | 7/2004 | Belik | 184/14 |

FOREIGN PATENT DOCUMENTS

| EP | 0857852 A2 | 8/1998 |
|---|---|---|
| GB | 2414524 B | 5/2006 |

OTHER PUBLICATIONS

PCT Search Report dated Nov. 29, 2004, for PCT/US2003/40918.
EP Search Report dated Feb. 24, 1999, for EP 0 857 852.

* cited by examiner

*Primary Examiner* — Robert Siconolfi
*Assistant Examiner* — San Aung
(74) *Attorney, Agent, or Firm* — Conley Rose, P.C.

(57) ABSTRACT

Methods and apparatus for applying a uniform application of an appropriate quantity of lubricant to the internal threads of a pipe. In general, the apparatus includes a high pressure supply of lubricant and a high speed, rotating centrifugal applicator for evenly applying the lubricant to internal threads. The system also includes a dosing system to regulate the distribution of lubricant by dispensing a consistent volume of lubricant at each application. Potential advantages of the embodiments include the repeatability and consistency of amount of lubricant on pipe threads (e.g. thickness).

20 Claims, 7 Drawing Sheets

CENTRIFUGAL APPLICATOR SYSTEM

BACKGROUND

The disclosure relates to threaded pipe connections and the like. More particularly, the disclosure relates to applying a lubricating material, such as pipe dope, to the internal threads of a pipe.

In the oil and gas production industry, threaded pipe connections are often used. Special types of lubricant compositions are used for application between the male and female parts of these threaded tubular connections. The use of a pipe thread dope, or "pipe dope" as it has been called, may be required to provide a more stable joint. Pipe dope is a paste-like material that is applied to clean internal pipe threads just prior to joint assembly and provides three basic benefits to a threaded pipe joint. First, it lubricates the threads which eases assembly and helps to prevent seizing and galling. Second, it acts as a sealant that enhances the gas-tightness or fluid-tightness of the resulting joint. And third, it prevents corrosion in drill pipe threads which aids in separation and reuse of drill pipe.

The process of applying pipe dope has basically not changed since its original utilization. Pipe dope is commonly packaged in tins, or cans, of varying size, so one may purchase a quantity that is appropriate to the task at hand. The common method of applying pipe dope is to acquire a portion of the dope from the tin with the brush, and apply the dope to internal pipe threads by brushing. This method does not, however, assure a uniform application of the dope, either over the threads of one fitting or from joint to joint. Also, the amount of dope used is not regulated or controlled, so too much or too little dope may be used. Each of these situations may compromise the quality, durability, and reliability of the resulting threaded pipe joint. For example, too little pipe dope on the threads may result in increased friction in the threads during spinning, which may cause galling of the threaded surface. Conversely, too much pipe dope on the threads may result in pollution of the system (e.g. excess pipe dope may fall into the drillstring).

In conventional methods, the quality of a threaded pipe joint is highly dependent upon the skill or craftsmanship of the user in applying the pipe dope. Thus, an apparatus to provide a uniform application of an appropriate quantity of pipe dope will greatly benefit the quality of threaded pipe joints. Further, it is advantageous to provide high centrifugal forces to the pipe dope to ensure uniform application and reduce application time.

SUMMARY

The disclosed embodiments described herein overcome the various deficiencies of the prior art by providing a method and apparatus for ensuring a uniform application of an appropriate quantity of pipe dope to the threads formed on the inside diameter of a pipe. In general, the apparatus includes a supply of pipe dope and a high-speed centrifugal applicator for evenly applying the pipe dope to internal threads. The system also includes a dosing system to regulate the distribution of pipe dope by dispensing a consistent volume of pipe dope at each application. Potential advantages of the embodiments include the repeatability and consistency of amount of pipe dope on pipe threads (e.g. thickness).

In one embodiment, an apparatus for applying a uniform coating of pipe dope to the internal threads of a pipe includes a supply of pipe dope, a dosing system adapted to draw a predetermined amount of pipe dope from the supply, and a high-speed centrifugal applicator adapted to receive the predetermined amount of pipe dope and use the enhanced centrifugal force of high speed rotation to apply the dope to the internal pipe threads. In some embodiments, the rate of rotation may be approximately 3,000-20,000 revolutions per minute and may continue at this speed for 3-5 seconds.

In an alternative embodiment, an apparatus for applying a uniform coating of pipe dope to the internal threads of a pipe includes a container having the lubricant contained within, a dosing device in fluid communication with the container, an applicator drum in fluid communication with the dosing device, and a motor connected to the applicator drum. In some embodiments, the applicator drum has a plurality of holes disposed therethrough in a pattern which depends upon the desired distribution of pipe dope within the pipe with larger and more numerous holes allowing more lubricant to flow through the drum and onto the corresponding pipe threads.

In another embodiment, a method for applying a coating of pipe dope on pipe threads includes placing a predetermined amount of pipe dope into a drum having a plurality of holes disposed thereon. The method includes placing the drum within the bore of a pipe having internal pipe threads and rotating the drum at a predetermined speed effective to distribute the pipe dope onto the pipe threads through the plurality of holes.

BRIEF DESCRIPTION OF THE DRAWINGS

For a more detailed description of the embodiments of the present disclosure, reference will now be made to the accompanying drawings, wherein.

DETAILED DESCRIPTION

Figure 1:
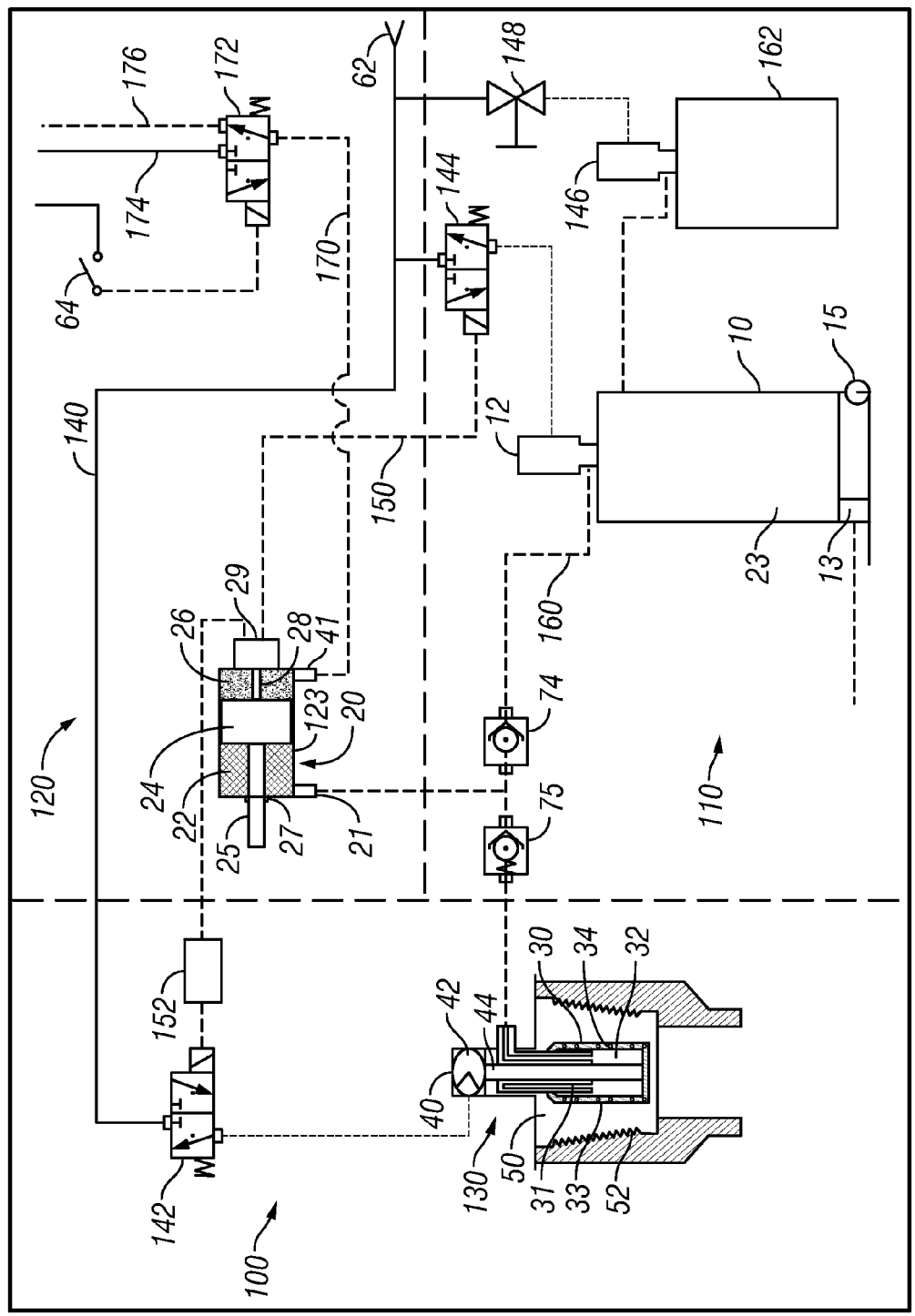
FIG. 1 is a schematic of one embodiment of a lubrication assembly at a first phase of operation.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results.

The embodiments disclosed are not limited to pipe doping applications and may find utility in other coating applications, both within oilfield technology and other areas to which the concepts of the current invention may be applied.

Unless otherwise specified, any use of any form of the terms "connect", "engage", "couple", "attach", or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". The phrase "internal threads" refers to the female threads cut into the end of a length of pipe. The terms "lubricant," "pipe thread dope," "pipe dope," and "thread compound" are interchangeable and describe a material that is capable of sealing and/or lubricating a pipe joint. In addition, reference to the terms "left" and "right" are made for purposes of ease of description. The terms "pipe," "tubular member," "casing" and the like as used herein shall include tubing and other generally cylindrical objects. In addition, in the discussion and claims that follow, it may be sometimes stated that certain components or elements are in fluid communication. By this it is meant that the components are constructed and interrelated such that a fluid could be communicated between them, as via a passageway, tube, or conduit. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, lubrication assembly 100 includes a lubricant supply 110, a dosing system 120, and a high-speed centrifugal applicator 130. In general operation, dosing system 120 draws a predetermined amount of lubricant from supply 110. Upon activation, centrifugal applicator 130 takes the predetermined amount of lubricant from supply 110 and distributes the lubricant on female pipe threads 52. The controlled dosing of the lubricant coupled with the even distribution of lubricant on the threads allows the embodiments to greatly improve the repeatability and consistency of lubricating threaded connections.

Lubrication assembly 100 may be configured for handheld use by a single operator or may be integrated into an automated pipe handling or iron roughneck system so that the threaded connections are automatically lubricated. As an example of one embodiment, lubrication assembly 100 will be described as a handheld, hydraulic, pneumatic and electrical system, but it is understood that the embodiment described is not the only embodiment contemplated and the features described may take the form of other embodiments. This handheld or integrated embodiment and other handheld or integrated embodiments may also be referred to as a means for locating the drum relative to the internal threads of a pipe.

FIGS. 1-5 depict one embodiment of an exploded lubrication assembly 100 at five different time points. Referring initially to FIGS. 1 and 6a, lubrication assembly 100 is shown at a first time point prior to lubrication. Lubrication assembly 100 includes a pipe dope container 10, a dosing device 20, a drum 30, and a motor 40. Pipe dope container 10 includes a grease pump 12 and is filled with a pipe dope 23. Pipe dope container 10 may be any container suitable for holding pipe dope 23, including, but not limited to, a bucket and a tank.

Dosing device 20 includes a dosing cylinder 123, a port 21, a pipe dope side 22, a piston 24, a piston rod 25, a hydraulic side 26, a piston rod bushing 27, and a dose adjust controller 29. Piston rod bushing 27 is located in the end wall of dosing cylinder 123 nearest pipe dope side 22 and around a circumference of piston rod 25. As shown in FIG. 1, piston 24 is in an extended position and the stroke, or amount of predetermined pipe dope 23, is limited by dose adjust controller 29. In some embodiments, dose adjust controller 29 may include a position sensor 28. In some embodiments, the stroke is varied in order to adjust the amount of pipe dope 23 to be applied. The dosing device 20 and those consistent with the teachings herein may also be referred to as a means for supplying a predetermined volume of lubricant.

Drum 30 includes a collection area 32 and a plurality of distribution holes 34 in its walls 33. Distribution holes 34 are placed in a pattern which depends upon the desired distribution of pipe dope within the pipe with larger and more numerous holes allowing more lubricant to flow through the drum and onto the corresponding pipe threads. For example, placement of larger and/or more holes at the top of the drum permits a greater quantity of lubricant to flow through the drum and onto the top, or leading, threads. The distribution holes 34 and those consistent with the teachings herein may also be referred to as a means for distributing pipe dope through drum 30. In an embodiment, the holes 34 are substantially equidistant apart from each other and arranged in rows 36 that span along the width and length of the walls. In an embodiment, drum 30 has at least 4 rows 36 of ten distribution holes 34. In another embodiment, distribution holes are 1/16" in diameter and are spaced 1/4" apart. During lubrication, drum 30 is located in opening 50 by centrifugal applicator 130, surrounded by female pipe threads 52.

Motor 40 is a pneumatic motor 42, such as are known in the art and are used for high-speed rotating hand tools such as grinders. Pneumatic motor 42 includes a rotor (not shown) connected to a shaft 44. Shaft 44 is connected to drum 30. The motor 40 and those consistent with the teachings herein may also be referred to as a means for rotating drum 30.

To better describe the operation of lubrication assembly 100 of FIG. 1, lubrication assembly 100 can be described as including four circuits, namely: (1) a high pressure gas circuit 140; (2) an electric circuit 150; (3) a pipe dope circuit 160, and (4) a hydraulic circuit 170. The gas utilized in these circuits is any gas or air. These circuits may be employed in any suitable combination to provide a power source for the lubrication assembly 100.

In the high pressure gas circuit 140, a gas supply 62 is connected to motor 40 through a motor valve 142, a grease pump 12 is connected through a grease pump valve 144, and a pipe dope resupply grease pump 146 is connected through pipe dope resupply grease pump valve 148. Both the grease pump 12 and the resupply grease pump 146 are gas actuated devices adapted to mechanically move pipe dope 23, eliminating the need for sealed pressure vessels. Pipe dope container 10 and resupply container 162 are thereby maintained at ambient pressure, allowing pipe dope 23 to be re-supplied without the need to break a pressure vessel seal to add more pipe dope 23.

In the electric circuit 150, grease pump valve 144 is connected to dose adjust controller 29, which is in turn connected to position sensor 28 and a timer 152. Timer 152 is also connected to motor valve 142. Electrical circuit 150 is connected to a start switch 64, which is connected to a hydraulic valve 172.

In the pipe dope circuit 160, pipe dope container 10 is connected through grease pump 12 to a low pressure check valve 74. Low pressure check valve 74 is connected to a high pressure check valve 75 and port 21 located on the pipe dope side 22 of dosing device 20. High pressure check valve 75 is also connected to a drum nozzle 31. In an embodiment, pipe dope container 10 is also connected through resupply grease pump 146 to resupply container 162. In another embodiment, pipe dope container 10 is also connected to a fill sensor 13 and a pivot 15.

In the hydraulic circuit 170, hydraulic valve 172 is connected to a hydraulic supply 174 and a hydraulic return 176. Hydraulic valve 172 is also connected through a hydraulic port 41 to hydraulic side 26 of dosing device 20.

Figure 2:
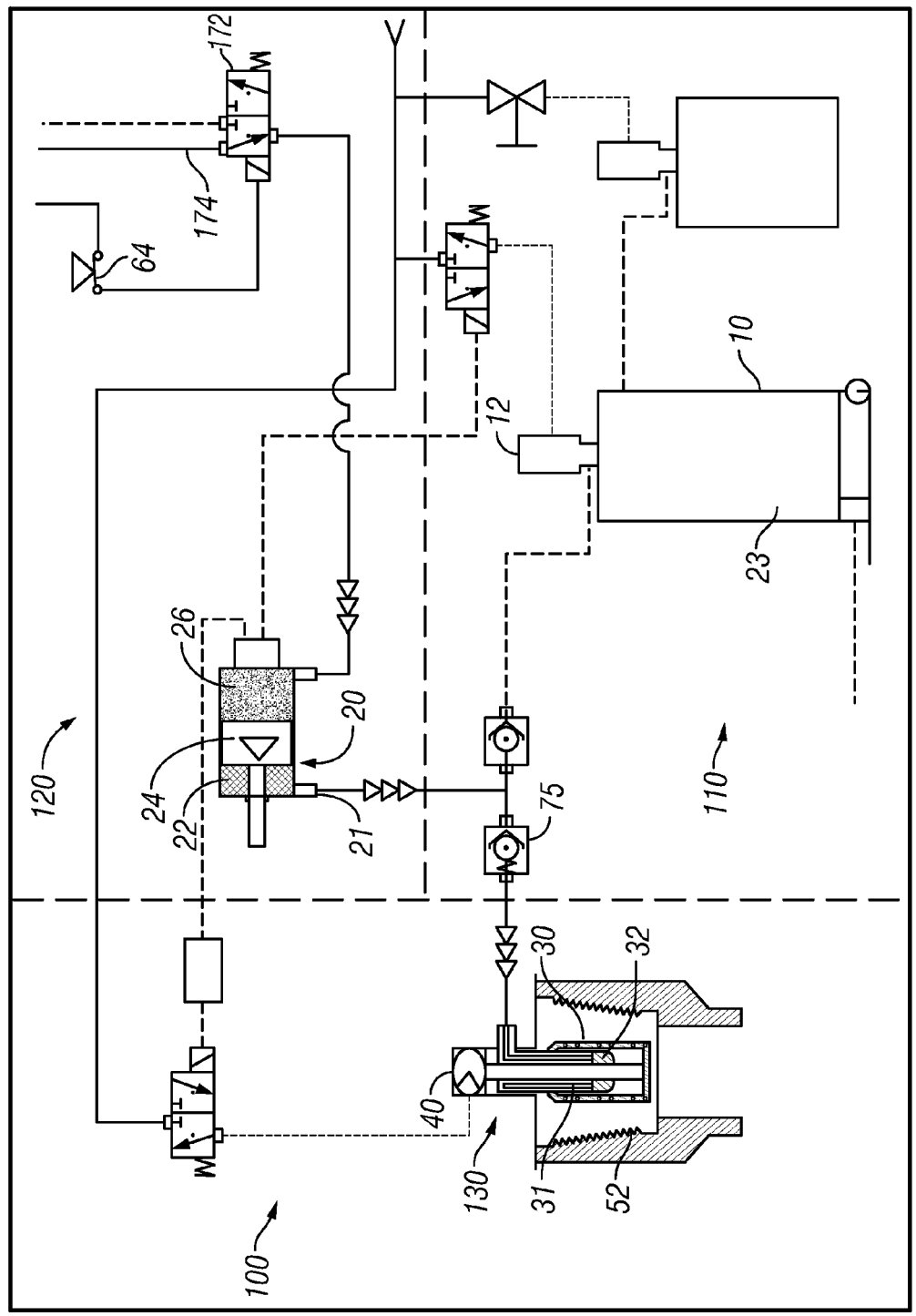
FIG. 2 is a schematic of the lubrication assembly of FIG. 1 at a second phase of operation.
Figure 6A:
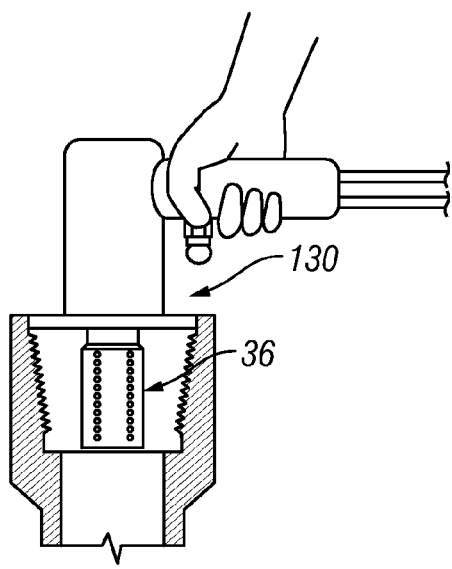
FIGS. 6a-6d are partial sectional schematics of FIGS. 1-4 illustrating the process of applying lubrication.
Figure 6B:
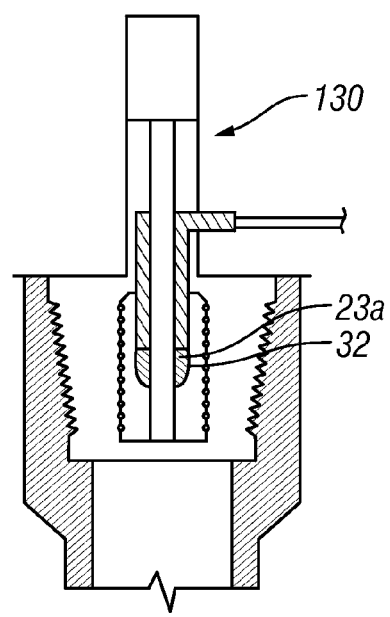

Referring now to FIGS. 2 and 6b, lubrication assembly 100 is shown at a second phase of operation, namely at the beginning of lubrication. In order for lubrication to begin, an operator engages start switch 64. This maneuver causes hydraulic valve 172 to open allowing hydraulic fluid from hydraulic supply 174 to flow into hydraulic side 26 of dosing device 20, the pressure of the hydraulic fluid entering hydraulic side 26 or dosing device 20 ranges between 2,000-3,000 pounds per square inch (p.s.i.). The pressure of the hydraulic fluid in the hydraulic side of device 20 forces piston 24 toward the pipe dope side 22 of dosing device 20. Thereby, piston 24 creates high pressure in pipe dope side 22 of dosing device 20. High hydraulic pressure, as used herein, refers to pressures greater than 2,000 p.s.i., for example, and alternatively to pressures greater than 3,000 p.s.i. High pressure check valve 75 is open, which allows piston 24 to force pipe dope 23 in pipe dope side 22 out of dosing device 20 through port 21. As piston 24 forces pipe dope 23 out of dosing device 20, piston 24 moves to the left, as indicated by the arrow. In the present embodiment, piston 24 forces all of pipe dope 23 out of dosing device 20. Pipe dope 23 passes through high pressure check valve 75 to a drum nozzle 31. Drum nozzle 31 directs pipe dope 23 into collection area 32 of drum 30. As shown in FIGS. 2 and 6b, a pool 23a of pipe dope 23 is formed in collection area 32.

Figure 3:
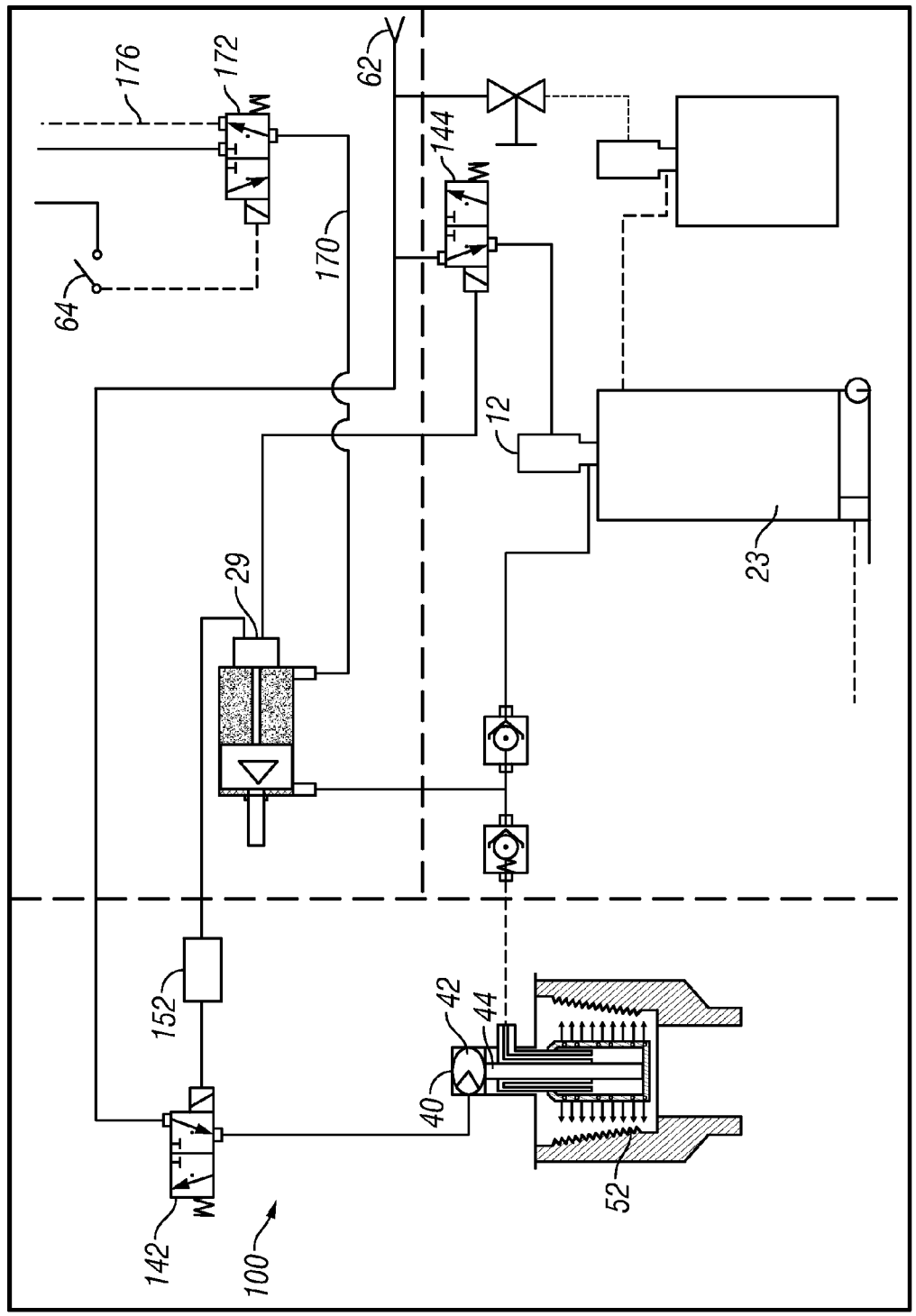
FIG. 3 is a schematic of the lubrication assembly of FIG. 1 at a third phase of operation.
Figure 6C:
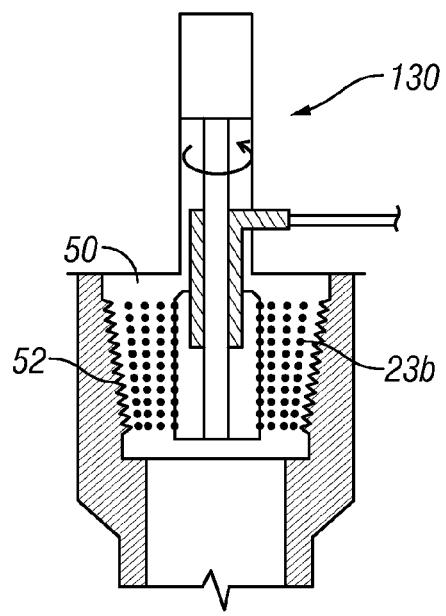

Referring now to FIGS. 3 and 6c, lubrication assembly 100 is shown at a third phase of operation, during application of the lubricant. The operator has released start switch 64 allowing hydraulic valve 172 to connect hydraulic circuit 170 to hydraulic return 176. Simultaneously, dose adjust controller 29 initiates two operations. In the first operation, dose adjust controller 29 signals timer 152 to open motor valve 142 for a preset amount of time allowing high pressure gas from gas supply 62 to flow to pneumatic motor 42 within motor 40. Gas forces the blades of the rotor (not shown) to turn, which in turn causes shaft 44 to rotate at a high rotational rate, as indicated by the arrow. In this embodiment, the speed that shaft 44 rotates is dependent upon a variety of factors including the pressure of the gas supply 62, the consistency of pipe dope 23, the size of pipe threads 52, the distance between lubrication assembly 100 and pipe threads 52 and the duration that timer 152 allows motor valve 142 to remain open. The high rate of rotation, as used herein, may be greater than 3,000 revolutions per minute, for example, and alternatively greater than 10,000 and up to 20,000 revolutions per minute, and may continue at this speed for 3-5 seconds. In the second operation, dose adjust controller 29 opens grease pump valve 144 allowing high pressure gas from gas supply 62 to actuate grease pump 12.

When shaft 44 rotates, drum 30 rotates and pipe dope 23 is discharged through the plurality of distribution holes 34 via centrifugal force. FIG. 6c shows droplets 23b of pipe dope 23 suspended in opening 50, which will deposit onto the surface of female pipe threads 52.

Figure 4:
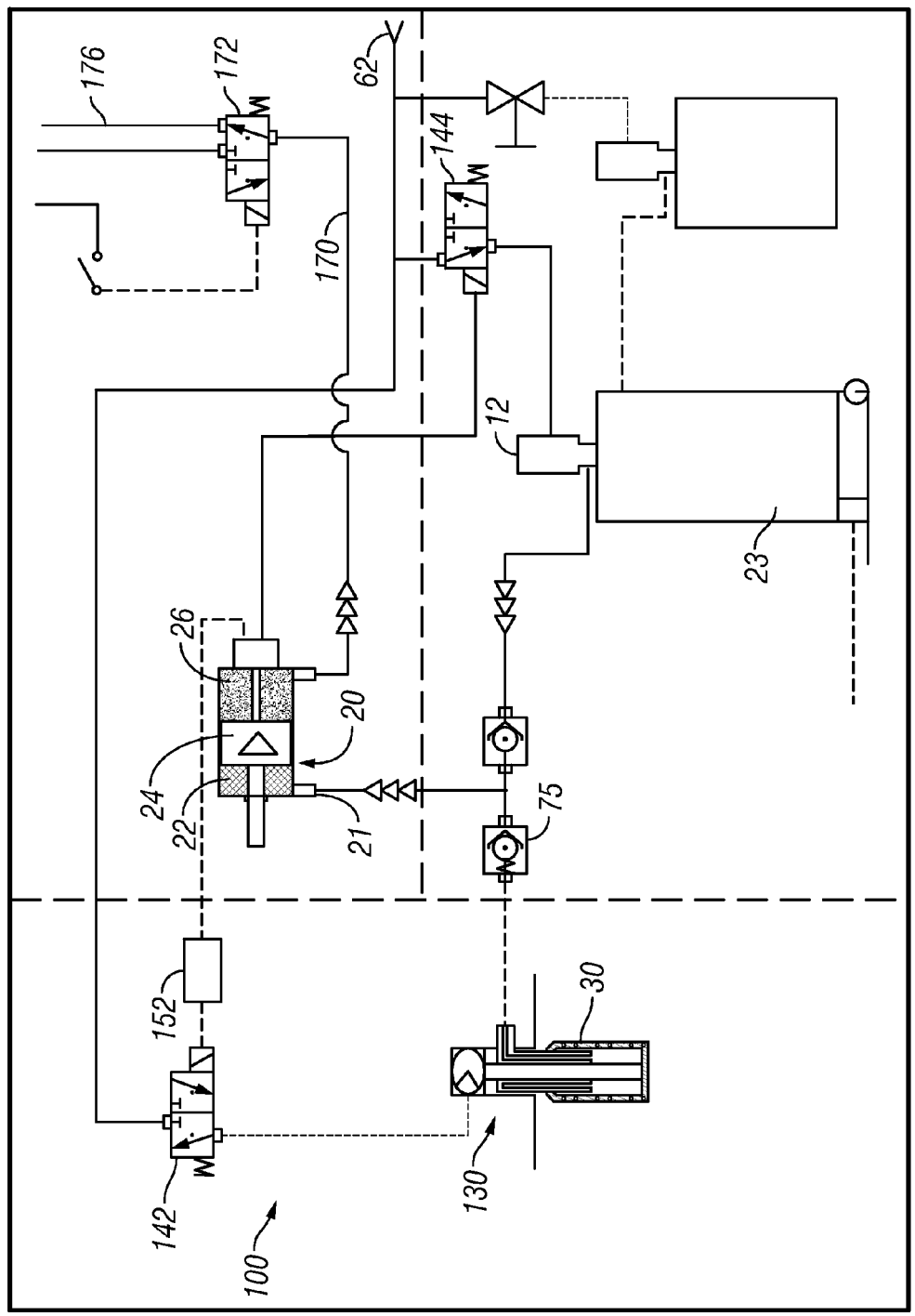
FIG. 4 is a schematic of the lubrication assembly of FIG. 1 at a fourth phase of operation.
Figure 6D:
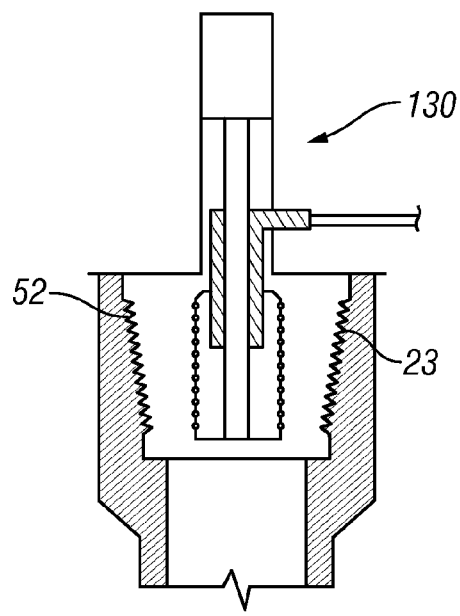

Referring now to FIGS. 4 and 6d, lubrication assembly 100 is shown at a fourth phase of operation, i.e., when lubrication is complete. As shown on FIG. 6d, pipe dope 23 has thoroughly coated the surface of female pipe threads 52. Additionally, timer 152 has closed motor valve 142 causing centrifugal applicator 130 to stop rotation. At this point, centrifugal applicator 130 has been removed from the pipe opening. As indicated above, high pressure gas from gas supply 62 now flows through grease pump valve 144 to grease pump 12. Grease pump 12 pumps pipe dope 23 from pipe dope container 10 through low pressure check valve 74. In this embodiment, pipe dope 23 does not flow to drum 30 because high pressure check valve 75 does not open by the low pressure produced by grease pump 12. Pipe dope 23 then passes through port 21 and into pipe dope side 22 of dosing device 20 and moving piston 24. As detailed above, hydraulic valve 172 now connects hydraulic circuit 170 to hydraulic return 176. This allows hydraulic fluid to displace from hydraulic side 26 of dosing device 20 as pipe dope 23 forces piston 24 to displace to the right, as indicated by the arrow.

Figure 5:
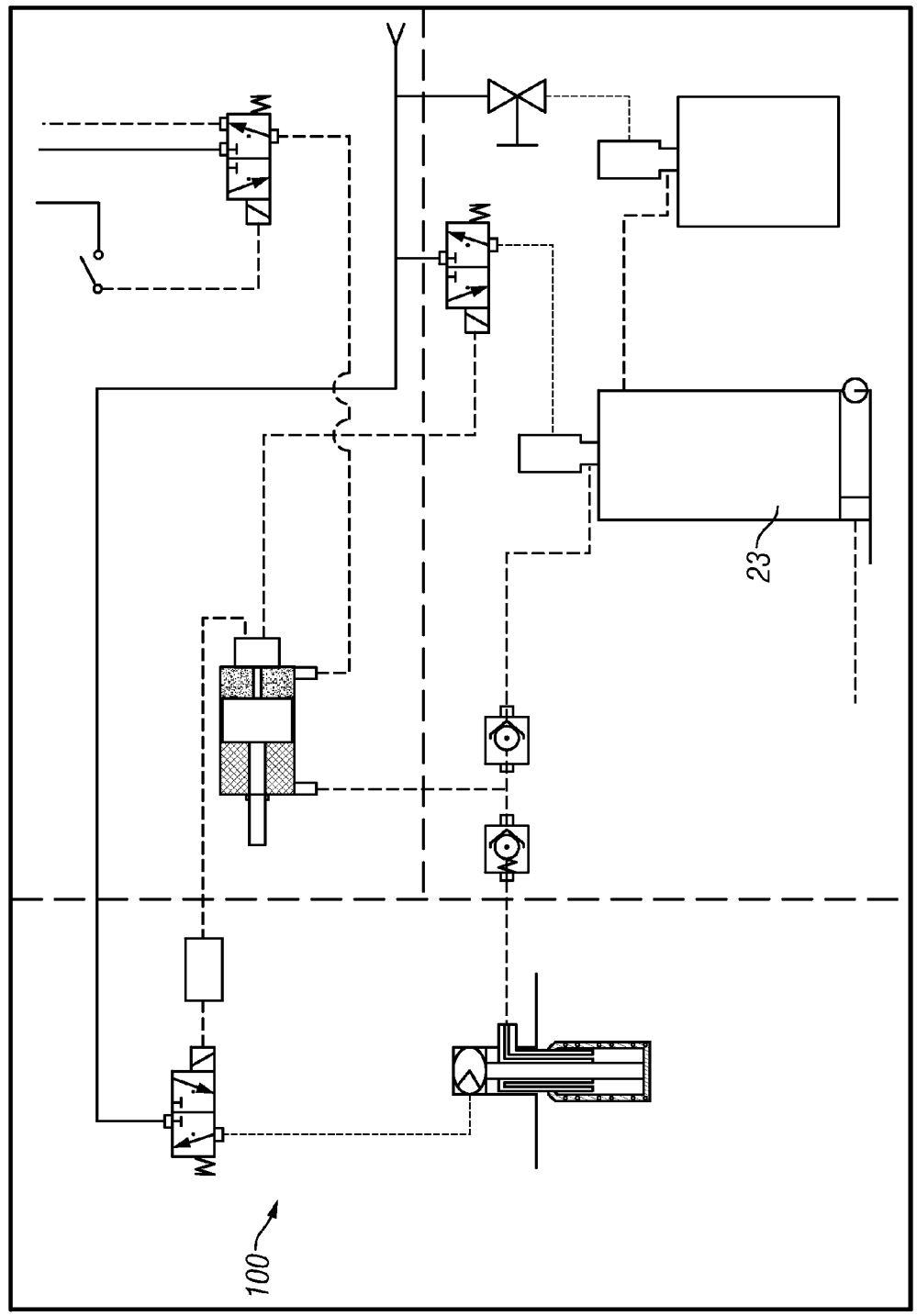
FIG. 5 is a schematic of the lubrication assembly of FIG. 1 at a fifth and final phase of operation.

Referring now to FIG. 5, lubrication system 100 has completed a full cycle. It is ready to repeat the cycle of being located into the opening of another pipe to apply pipe dope 23 to the female pipe threads.

In an embodiment, when pipe dope container 10 begins to run low on pipe dope 23, fill sensor 13 will give an indication to the operator to add pipe dope 23 to pipe dope container 10. Fill sensor 13 may be any of a number of devices allowing measurement of the amount of pipe dope 23 remaining in container 10, including, but not limited, to a spring-based device which deforms as the weight of pipe dope 23 in container 10 changes or a strain gage-based device in which resistance is related to the varying weight of pipe dope 23 in container 10. Pivot 15 allows container 10 to rotate should the fill sensor 13 require such movement. The sensor 13 and other sensors consistent with the teachings herein may also be referred to as a means for indicating a low pipe dope level.

In another embodiment, container 10 may be refilled by opening pipe dope resupply grease pump valve 148 allowing high pressure gas from gas supply 62 to flow to resupply grease pump 146. Resupply grease pump 146 pumps dope 23 from resupply container 162 to pipe dope container 10. In this manner, pipe dope container 10 maintains a constant supply of pipe dope 23. The container 10 and pump 146 and other containers and pumps may also be referred to as a means for re-supplying pipe dope.

Figure 7:
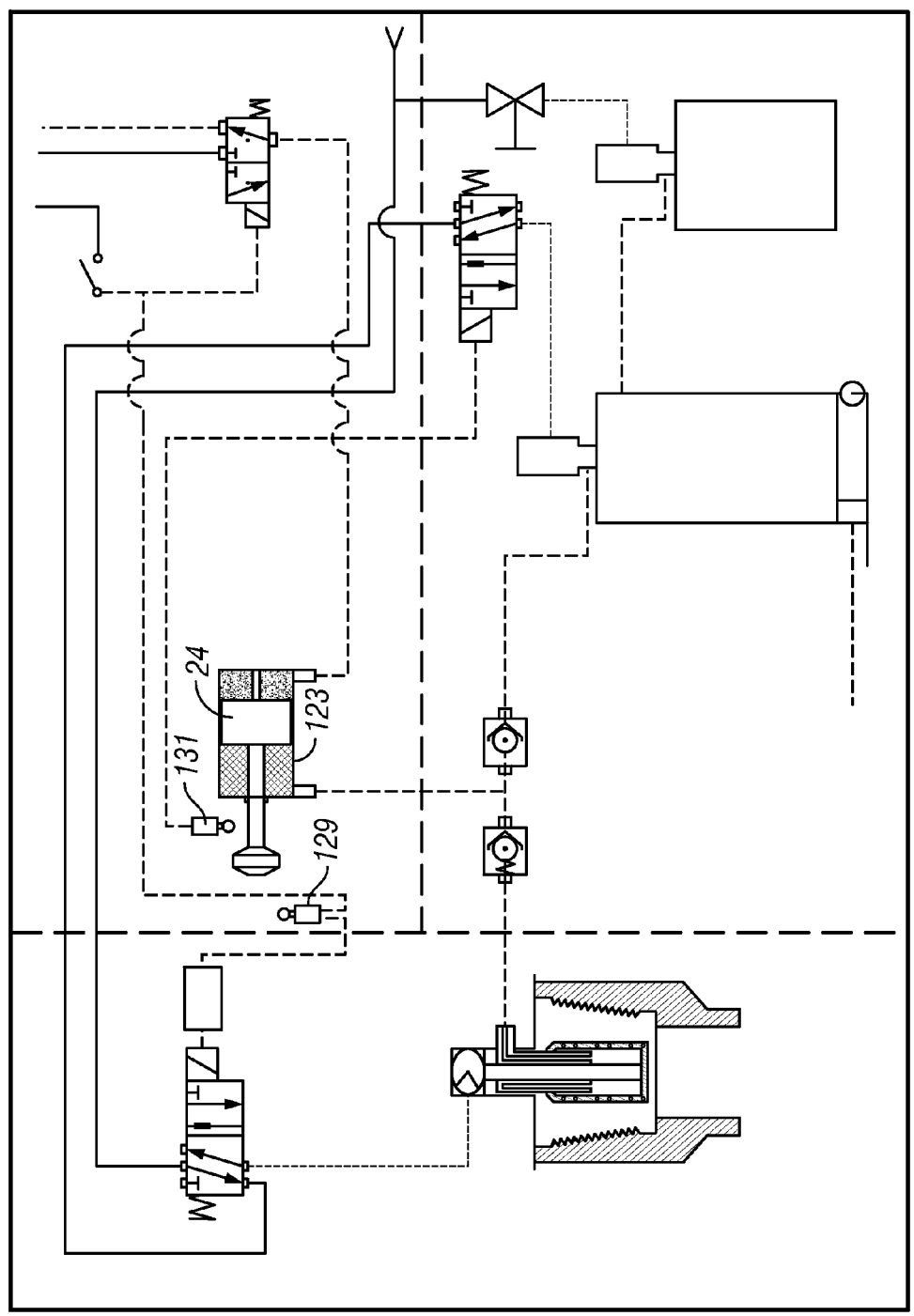
FIG. 7 is a schematic of another embodiment of a lubrication assembly including limit switches.

Referring now to FIG. 7, in yet another embodiment, dose adjust controller is replaced by a first limit switch 129 to indicate dose intake is complete and a second limit switch 131 to indicate dose empty. Second limit switch 131 may be moveably coupled relative to the dosing cylinder 123 thus permitting adjustment of the stroke of the cylinder. In another embodiment, dose adjust controller is replaced by a potentiometer (not shown) to indicate the position of the piston 24 which provides flexibility for the disclosure to be used in more modern rigs.

While the lubrication assembly of the present invention has been described in terms of a manually operated device, in an embodiment, the lubrication assembly may be machine operated, e.g., by a robotic arm. A potential benefit of having a machine-operated device is that the operator does not need to be on the drill floor during lubrication; rather, the operator may control the lubrication from a remote location. For example, a lubrication assembly could be integrated into an automatic pipe handling or pipe racking system so that the pipe joints are automatically lubricated as they are being moved into position on the drill floor. Similarly, a lubrication assembly could be integrated into a top drive system so that the pipe joint can be lubricated as pipe is being run into the hole. Systems such as these could eliminate the need for personnel either on the drill floor or the monkey board applying lubricant to pipe joints during operations.

In the disclosed embodiments, the combination and interaction of the high pressure gas circuit 140, the electric circuit 150, the pipe dope circuit 160, and the hydraulic circuit 170 allow the centrifugal applicator 130 to rotate the drum 30 at high speeds which overcome the inherent viscosity of the pipe dope and other efficiency losses in the system to ensure uniform application of the pipe dope. Additionally, the high speed rotation of the drum 30 also reduces the time necessary to complete an application cycle as described herein.

While the invention is susceptible to various modifications and alternative forms, specific embodiments thereof are shown by way of example in the drawings and description. It should be understood, however, that the drawings and detailed description thereto are not intended to limit the invention to the particular form disclosed, but on the contrary, the intention is to cover all modifications, equivalents and alternatives falling within the spirit and scope of the present invention.

What is claimed is:

1. An apparatus for applying a lubricant to the internal bore of a pipe comprising:
    a container having the lubricant contained within;
    an adjustable dosing device having a hydraulic side and a pipe dope side in fluid communication with the container;
    a rotatable drum in fluid communication with the pipe dope side of the dosing device, the drum having a plurality of holes therethrough;
    a motor connected to the drum; and
    an actuation system coupled to the dosing device and the motor, the actuation system including a gas circuit, an electric circuit, and a hydraulic circuit in fluid communication with the hydraulic side of the dosing device.

2. The apparatus of claim 1, wherein the gas circuit is adapted to drive the motor and the electric circuit is adapted to disengage the motor from the gas circuit.

3. The apparatus of claim 1, further comprising a pump coupled to the container, the pump adapted to deliverer the lubricant to the pipe dope side of the dosing device.

4. The apparatus of claim 1, wherein the hydraulic circuit is adapted to supply hydraulic fluid to the hydraulic side of the dosing device and a piston in the dosing device, whereby lubricant in the pipe dope side of the dosing device is forced by the piston from the dosing device toward the drum.

5. The apparatus of claim 1, wherein the gas circuit comprises a pressurized gas source.

6. The apparatus of claim 4, wherein the hydraulic circuit comprises a hydraulic supply and a hydraulic return each coupled to the hydraulic side of the dosing device.

7. The apparatus of claim 1 wherein the dosing device includes an electronic controller adapted to adjust the stroke of a piston in the dosing device.

8. The apparatus of claim 1 further comprising a switch adapted to regulate the flow of hydraulic fluid to the dosing device before the motor is activated.

9. The apparatus of claim 1, further comprising an electronic controller adapted to start a timer to regulate the flow of gas to the motor for a predetermined duration and to regulate the flow of gas to a pump.

10. The apparatus of claim 1 further comprising an electronic controller having a first limit switch adapted to indicate that a dosing device piston is extended and a second limit switch adapted to indicate that the piston is retracted.

11. The apparatus of claim 10 wherein the second limit switch is moveably coupled to the dosing device and adapted to adjust the piston stroke.

12. The apparatus of claim 1 further comprising a potentiometer coupled to the dosing device and adapted to indicate the position of a dosing device piston.

13. An apparatus for applying a lubricant to the internal bore of a pipe comprising:
    a means for supplying a predetermined volume of lubricant to a drum;
    a means for rotating the drum; and
    a means for controlling the distribution of lubricant through the drum.

14. The apparatus of claim 13 further comprising means for locating the drum relative to an internal curved surface.

15. The apparatus of claim 13 further comprising means for re-supplying lubricant.

16. The apparatus of claim 15 further comprising means for indicating a low lubricant level.

17. A method for applying a coating of lubricant on pipe threads, the method comprising:
    engaging an electric circuit;
    supplying a lubricant to a dosing device;
    engaging a hydraulic circuit to supply a hydraulic fluid to the dosing device;
    forcing lubricant from the dosing device to a drum as hydraulic fluid is received by the closing device; and
    rotating the drum with a motor at a predetermined high speed effective to distribute the lubricant onto the pipe threads.

18. The method of claim 17 further comprising drawing a predetermined amount of lubricant from a lubricant supply to the dosing device.

19. The method of claim 17 further comprising re-supplying a lubricant container.

20. The method of claim 17, further comprising:
    electrically actuating a valve between a motor coupled to the drum and a gas supply, whereby high pressure gas is supplied to the motor; and
    electrically actuating a valve between a pump in fluid communication with the lubricant and the gas supply, whereby the pump is driven to convey the lubricant toward the dosing device.

* * * * *